UNITED STATES PATENT OFFICE.

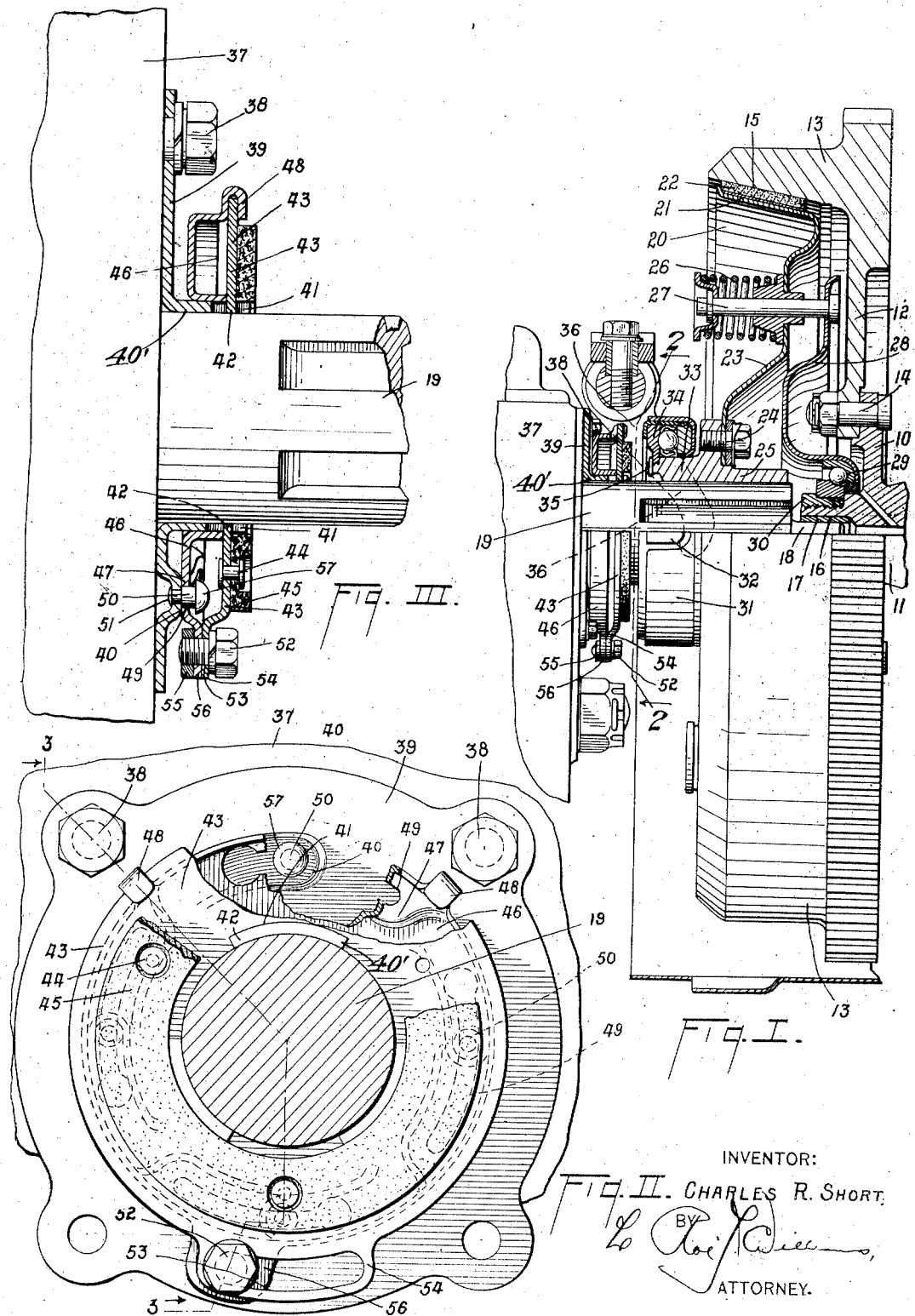

CHARLES R. SHORT, OF DETROIT, MICHIGAN, ASSIGNOR TO GENERAL MOTORS COMPANY, OF DETROIT, MICHIGAN, A CORPORATION OF NEW JERSEY.

HYDROCARBON-MOTOR.

1,396,891. Specification of Letters Patent. Patented Nov. 15, 1921.

Application filed May 28, 1917. Serial No. 171,494.

*To all whom it may concern:*

Be it known that I, CHARLES R. SHORT, a subject of the King of Great Britain, and resident of Detroit, Wayne county, State of Michigan, have invented certain new and useful Improvements in Hydrocarbon-Motors, of which the following is a specification.

This invention relates to hydrocarbon motors, and more particularly to improvements in brakes or clutches therefor.

One of the objects of this invention is to provide an adjusting device for clutches or brakes, particularly of the disk type.

Another object of this invention is to provide a clutch or brake with a very simple and inexpensive cam operated adjusting means.

Another object of this invention is to provide the stationary member of a clutch brake, with improved means for adjusting it relative to the rotatable member.

These, and various other objects, will more clearly appear from the following description, taken in connection with the accompanying drawings, which form a part of this specification and in which:

Figure 1 is a fragmentary side elevation with portions, in section, of a cone clutch, especially adapted for use in a motor vehicle power plant, and embodying a preferred form of my invention.

Fig. 2 is an enlarged transverse vertical section with portions broken away and others in section, substantially on the line 2—2 of Fig. 1; and Fig. 3 is a longitudinal section, substantially on the line 3—3 of Fig. 2.

Referring to the drawings, 10 illustrates a flange formed on the rear end of a driving or crank shaft 11 of a hydrocarbon motor. The web 12 of a fly wheel 13 is secured to the flange by bolts 14. The fly wheel is formed interiorly with a conical surface forming a clutch driving member 15. The rear end of the crank shaft 11 is drilled out as at 16, for the insertion of a bearing 17 in which the contracted forward end 18 of a driven shaft 19 is mounted.

The driven member of the clutch comprises a stamping 20 having a frusto conical peripheral flange 21 and a suitably secured friction facing 22 fitted interiorly of the driving member 15. The web 23 of the driven member 20 is secured by bolts 24 to a sleeve 25 which has an axially shiftable splined fit on the driven shaft 19. The driving and driven clutch members 15 and 20 are normally maintained in driving contact by means of springs 26, bolts 27 and a clamping plate 28 which is mounted on the rear end of the crank shaft 11 through an antifriction ball bearing 29. This bearing is detachably secured in position by a threaded collar 30.

The particular arrangement of parts above described is quite immaterial and the construction is shown and described merely as illustrative of a friction clutch of the cone type and the well known disk type of clutch may just as readily be used in conjunction with the invention, as hereinafter described.

A shifting collar 31 having a pair of oppositely arranged lugs 32 is mounted on the rear hub 33 of the sleeve 25 and is held in position by a threaded braking plate 34, which may be locked in its adjusted position as by means of a pin 35. The shifting collar 31 may be moved to the left for disengaging the driving and driven clutch members 15 and 20 respectively, by swinging the usual forked shifter 36 illustrated in dotted lines in Fig. 1.

The shifting collar 31 and parts such as the shifter 36 are described only as illustrative of any of the well known forms of shifter collars and means for clutch mechanisms whereby the driven clutch part may be retracted from engagement with the driving part, and it is only necessary to the present invention that the sleeve or hub part 25 has a part such as the plate 35 secured thereto or forming part thereof to engage with an adjustable friction plate as hereinafter described.

Secured to a suitable base, such as a gear box 37, by bolts 38, is an anchor plate 39 formed with several struck up cam surfaces 40. This anchor plate is provided with a tubular portion 40′ having a plurality of circumferentially arranged slots 41 in which are slidably fitted the internally formed splines 42 of a friction plate 43 to which is secured as by rivets 44, a fabric facing 45.

Sleeved on the tubular portion 40′ between the friction plate 43 and the anchor plate 39 is a rotatable adjusting plate 46 having a plurality of struck up cam surfaces 47 adapted to coöperate with the cam surfaces 40 on the plate 39. The periphery of the plate 46 is provided with struck up centering and supporting lugs 48 for the plate 43. It will be noted that the rotatable plate 46 is provided with key hole slots 49, through which extend centering and locking studs 50 which are riveted as at 51 to the anchor plate 39.

The several parts associated with and secured to the anchor plate 39 are a unit when adjusted and are securely and fixedly mounted on the gear box 37 or other base. That is, the anchor plate 39 has the friction plate 43 splined on the tubular extension thereof and between these plates the adjusting plate 46 is arranged with a limited circumferential movement to adjust the cam surfaces thereon in relation to the cam surfaces on the anchor plate, and thus adjust the position of the friction plate 43 and the outer face of the fabric facing 45 carried thereby.

It will be noted that when the clutch is released and the brake applied by shifting the collars 31 and sleeve 25 to the left, any tendency to rotate the stationary friction plate 43 is resisted by means of the splined connection 41 and 42 with the anchor plate 39.

When it is desired to compensate for wear between the brake members, the stationary plate 43 may be moved axially to the right on its splined mounting by rotating the cam plate 46 relative to the complementary surface 40 on the anchor plate 39. When the desired adjustment has been effected, the plate 46 may be locked against further rotation by passing a bolt 52 through a slot 53 which is formed in a lug 54 formed at the bottom of the plate 43 and fastening the bolt by means of a nut 55 to a lug 56 formed on the adjusting plate 46.

It will be noted that normally there is considerable clearance between the under side of the heads 57 of the centering studs 50 and the adjacent portion of the plate 46 for permitting a considerable axial adjustment of this plate relative to the anchor plate 39.

It will be understood that the adjusting plate 46 may be entirely detached from the anchor plate 39 by rotating it until the enlarged portion of the key-hole slots 49 surround the heads 57 of the centering studs, at which time one plate may be removed from the other by an axial movement.

While I have described and will specifically claim what I deem to be a preferred embodiment of my invention, it will be obvious to those skilled in the art, that various modifications and changes may be made without departing from the spirit and scope hereof.

Having thus described my invention, what I claim and desire to secure by Letters Patent is:

1. In combination, a rotatable driving clutch member; a driven clutch member rotatable about an axis coincident with the axis of said driving clutch member and movable along said axis to thereby cause said members to engage with and move apart from one another; means for moving said driven clutch member along its axis of rotation; a braking member secured to said driven clutch member and rotatable therewith; a second braking member stationary relative to said first mentioned braking member and to said driven clutch member, and with which second braking member said first mentioned braking member may be made to engage; and cam means arranged concentric with the axis of rotation of said clutch members and angularly adjustable about said axis for adjusting said second mentioned braking member along said axis and relative to said first mentioned braking member.

2. In combination with a driving and a driven clutch member rotatable about a common axis, and one of which members is movable along said axis to cause said members to engage and disengage one another; a braking member carried by and partaking of the movement of the movable one of said clutch members; a second braking member concentric with said first mentioned braking member and with which said first mentioned braking member may be made to engage; a stationary anchor plate concentric with said braking members; means for adjusting said second braking member relative to said anchor plate; and means for providing a slidable splined connection between said second braking member and said anchor plate.

3. In a device of the class described, a driving clutch member and a driven clutch member rotatable about a common axis and which driven member is movable along said axis and independently of said driving member; a braking member secured to and partaking of the movement of said driven member; means for shifting said driven member along the common axis of rotation of said members; a second braking member non-rotatably held in position adjacent said first mentioned braking member, and with which said first mentioned braking member may be made to engage; and cam means rotatable about the axis of rotation of said clutch members and which cam means is in operative engagement with said second mentioned braking member, to thereby adjust the same relative to said first mentioned braking member.

4. In a clutch mechanism of the class described, a driving and driven clutch member rotatable about a common axis and one of which is movable along said axis to thereby disengage the driving connection between said members; a braking member concentric with the axis of rotation of said members and movable with the movable one of said members; a second relatively stationary braking member concentric with the axis of rotation of said members and with which said first mentioned braking member may be made to engage; an anchor plate whereby said second mentioned braking member is supported, and relative to which the same is movable; means for restraining said second mentioned braking member from rotation relative to said anchor plate; and an angularly adjustable member carried by said anchor plate and having cam surfaces for effecting the adjustment of said second mentioned braking member along the axis of rotation of said clutch members.

5. In combination with a brake member which is rotatable, and which is also shiftable bodily along its axis of rotation; a coöperating friction plate annular in form and concentric with the axis of rotation of said brake member, and non-rotatable relative thereto; a stationary anchor plate; means for providing a slidable connection between said friction plate and said stationary anchor plate; and means for adjusting said friction plate relative to said anchor plate and along the axis of rotation of said brake member.

6. In combination with a rotatable brake member axially shiftable along its axis of rotation, a coöperating friction plate located adjacent said brake member and concentric with the axis of rotation thereof; a stationary anchor plate; means for providing a spline connection between said friction plate and said anchor plate to thereby permit said friction plate to be moved relative to said anchor plate while preventing rotation of said friction plate relative to said anchor plate; and cam means arranged between said friction plate and said anchor plate and in operative engagement with said friction plate to thereby adjust the position thereof along the axis of rotation of said brake member.

7. In combination with a rotatable and axially movable braking member, a coöperating friction plate annular in form and concentric with the axis of rotation of said braking member; a stationary anchor plate concentric with the axis of said braking member; means for preventing rotary movement of said friction plate about the axis of rotation of said braking member; and an angularly adjustable cam member arranged between said anchor plate and said friction plate and in operative engagement with the latter, to thereby adjust the same relative to said braking member.

8. The combination with the rotatable braking member shiftable bodily along its axis of rotation, of a coöperating friction plate annular in form and located adjacent said braking member, and which friction plate is provided with inwardly extending lugs; a stationary anchor plate surrounding the axis of rotation of said braking member and having a tubular portion provided with a series of slots into which the lugs aforesaid extend; an angularly adjustable cam member supported upon the hub aforesaid of said anchor plate; and cam means carried by said cam member for adjusting said friction plate relative to said braking member.

9. In a device of the class described, a rotatable and axially shiftable braking member; a friction plate stationary relative to said braking member and with which said braking member may be made to engage; a stationary anchor plate; means carried by said friction plate and engaging said anchor plate to thereby prevent movement of said friction plate relative to said anchor plate; an angularly adjustable cam plate in engagement with said friction plate to thereby adjust the same along the axis of rotation of said braking member; and coöperating cams upon said anchor plate and said cam plate and through which said cam plate and friction plate are caused to move along the axis of rotation of said braking member as said cam plate is angularly adjusted about said axis.

10. The combination with a rotatable braking member shiftable along its axis of rotation, a non-rotatable friction plate with which said braking member may be made to engage; a stationary anchor plate; a cam carried by said anchor plate; a cam plate located between said anchor plate and said friction plate and angularly adjustable about the axis of rotation of said braking member; and means for locking said cam plate against angular movement in the various positions into which it may be adjusted.

11. The combination with a rotatable braking member axially shiftable along its axis of rotation; a stationary anchor plate concentric with the axis of rotation of said braking member; a friction plate concentric with the axis of rotation of said braking member and which friction plate and anchor plate are provided with coöperating means for preventing the rotation of said friction plate; an angularly adjustable cam plate located between said friction plate and said anchor plate; cams upon said cam plate and said anchor plate and in engagement with one another to thereby vary the position of said friction plate relative to said anchor plate; and means for securing said friction plate and said cam plate together in the various positions assumed by said cam plate in adjusting the same angularly.

12. In a device of the class described, a stationary anchor plate having a tubular portion; a cam plate angularly adjustable upon the tubular portion of said anchor plate; coöperating cams upon said anchor plate and said cam plate; a friction plate having inwardly extending lugs which lie within slots provided in the tubular portion of said anchor plate; and lugs formed at the periphery of said cam plate and which lugs engage the periphery of said friction plate.

In testimony whereof I affix my signature.

CHARLES R. SHORT.